United States Patent Office 3,605,794
Patented Sept. 20, 1971

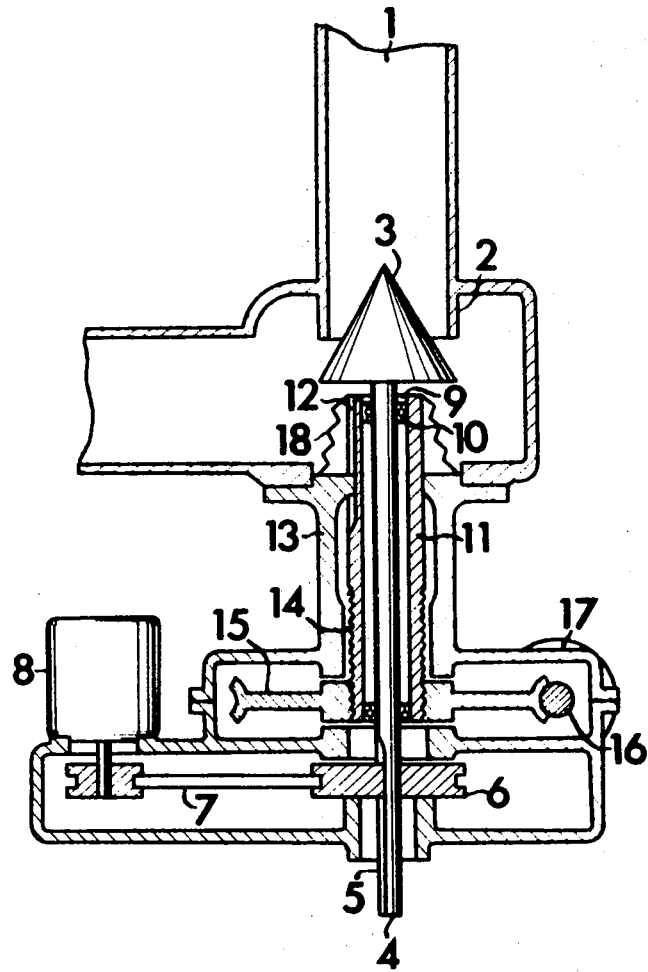

3,605,794
APPARATUS FOR FLOW CONTROL OF SLURRY
Hajime Seo, Katsumi Tagomori, and Toshio Okazaki, Yokohama-shi, Japan, assignors to Kurita Water Industries, Ltd.
Filed May 26, 1969, Ser. No. 827,785
Claims priority, application Japan, May 30, 1968, 43/36,969
Int. Cl. F16k 29/02
U.S. Cl. 137—331
2 Claims

ABSTRACT OF THE DISCLOSURE

A valve assembly for controlling the flow of a slurry or the like material comprising a valve seat, a closure member, which, in accordance with the valve seat, defines a valve opening, and a means for rotating the closure member so as to avoid clogging between said closure member and the valve seat.

---

The present invention relates to a valve assembly for controlling the flow of a slurry, or like material such as high concentration sludge, having a tendency to clog.

Such materials are very likely to deposit and to become clogged at any restriction in their flow path, and consequently it is difficult to effectively control their flow, which control is needed particularly where the material is being transferred, for example at the outlet port of a hopper or a cyclone.

Needle valves are frequently used for flow control of fluid materials, but are not generally successful with clogging materials such as slurries as particles will deposit, or "bridge" in the valve opening, making it impossible to completely cut off the flow.

The present invention provides a valve assembly for controlling the flow of a slurry or like material having a tendency to clog, comprising a valve seat, a closure member, which, in conjunction with the valve seat, defines a valve opening, and means for rotating the closure member, so as to avoid clogging between said closure member and the valve seat when the valve assembly is in use.

Rotation of the closure member, in accordance with the invention, avoids clogging of the valve opening and the consequent inability of the valve to operate, and also avoids changing the concentration of the flowing material, which results from deposition of solid matter. In order that the invention may be more clearly understood, an embodiment in accordance with it will now be described, by way of example, with reference to the accompanying drawing, which shows a valve assembly.

In the accompanying drawing, a reference numeral 1 indicates a flow path in which a valve seat 2 is provided. A closure member 3, in conjunction with the seat 2, defines a valve opening, and has a cross sectional shape which converges towards the valve seat 2, and is in this embodiment conical. Closure member 3 is secured to one end of a shaft 4, which engages with a pulley wheel 6 by means of keyway 5. Pulley 6 is rotated by a motor 8 via a belt 7. Keyway 5 acts as a sliding coupling which permits transmission of rotary motion to shaft 4.

A vertically moveable sleeve 11 is provided within which shaft 4 is rotatably mounted on bearings 10. A packing ring is provided at 9. Sleeve 11 is also formed with a keyway 12, which engages with a fixed housing 13. The lower portion 14 of sleeve 11 is externally threaded, and the thread engages with an internal thread on a gear wheel 15. Said gear wheel 15 engages with a worm 16, which can be rotated by a motor 17. An extensible seal 18 is fixed to sleeve 11 and casing 13 at its respective ends.

When motor 17 is rotated, gear 15 will also be rotated, but rotation of sleeve 11 is prevented by the engagement of keyway 12 and housing 13. Consequently sleeve 11 then moves vertically because of the engaging screw threads, so that closure member 3 moves towards or away from valve seat 2, depending on the direction of rotation of motor 17. Thus the valve opening between valve seat 2 and closure member 3 can be adjusted at will by driving motor 17 as necessary.

When motor 8 is rotated, driving pulley wheel 6, shaft 4 and closure member 3 will also rotate as they are connected to pulley wheel 6. Motor 8 is kept rotating at all times in order to give closure member 3 a constant rotation, and this overcomes the tendency of a slurry to deposit particles, producing the bridge making phenomenon which results in undesired changes of flow rate and also in clogging. This is thought to be due to the physical action at the rotating closure member, which tends to make any deposited material get entrained in the flow and carried away.

Incomplete cut-off of the flow, which otherwise might have been caused by clogging, can be prevented if the valve is closed while closure member 3 is kept rotating. The rate of rotation of closure member 3 is not very critical, but may be between 60 and 100 r.p.m.

In applying the invention to a slurry outlet port of a hopper or a cyclone, the edge of outlet port can be used as the valve seat and the closure member can be arranged against the port and movable into and out of contact with the edge of the port.

It is preferable to adjust the opening between the valve seat and the closure member while the latter is rotating, but rotation may be stopped while the valve opening is being adjusted. Gear 15 may be selectively connected to motor 8 by utilizing a suitable clutch arrangement, thus enabling motor 8 both to rotate the closure member 3 and also to adjust the valve opening.

The adjustment of the valve opening may be done manually instead of using motor 17, if a suitable manually operable adjusting mechanism is provided. A rack and pinion arrangement may be used for adjustment of the valve opening, in place of the screw arrangement shown. Then the degree of opening can be indicated by attaching a suitable index to the rack.

Having thus described certain forms of the invention in some detail, what is claimed is:

1. A valve assembly for controlling the flow of a slurry or like material having a tendency to clog comprising a fixed housing, said housing including a key at one end, a sleeve in said housing, said sleeve having an outer longitudinal keyway at one end and a threaded portion at its other end, said threaded portion extending beyond said housing and engaging a threaded gear wheel, said longitudinal keyway slidably engaging said housing key, a shaft, said shaft longitudinally rotatably engaged in said sleeve, said shaft including a keyway at one end beyond said sleeve thread, said shaft including a closure member at its other end, a pulley wheel including a key, said pulley wheel longitudinally slidably engaging said shaft and rotatable therewith, means to rotate said pulley wheel and shaft, and a valve seat adjacent said closure member, said sleeve and shaft and closure moveable to or from said valve seat by said threaded gear wheel.

2. A valve assembly according to claim 1 in which the closure member has a cross sectional shape which converges in a direction towards the valve seat.

References Cited
UNITED STATES PATENTS

| | | | |
|---|---|---|---|
| 1,287,756 | 12/1918 | Rork | 137—331 |
| 1,966,209 | 7/1934 | Miller | 251—134X |
| 2,177,265 | 10/1939 | Rath | 137—331X |
| 3,319,298 | 5/1967 | Kiraly | 18—2IX |

M. CARY NELSON, Primary Examiner

R. GERARD, Assistant Examiner

U.S. Cl. X.R.

251—267